US011093760B2

(12) United States Patent
Savla et al.

(10) Patent No.: US 11,093,760 B2
(45) Date of Patent: Aug. 17, 2021

(54) PREDICTING FEATURES ON A ROAD NETWORK WITH REPEATING GEOMETRY PATTERNS

(71) Applicant: HERE Global B.V., Eindhoven (NL)

(72) Inventors: Danny Savla, Chembur (IN); Pritesh Menon, Mumbai (IN); Lata Gawade, Mumbai (IN); Swathi Sree Durga Mudda, Vijayawada (IN); Nikhil Bhagat, Faridabad (IN)

(73) Assignee: HERE Global B.V., Eindhoven (NL)

( * ) Notice: Subject to any disclaimer, the term of this patent is extended or adjusted under 35 U.S.C. 154(b) by 269 days.

(21) Appl. No.: 16/058,410

(22) Filed: Aug. 8, 2018

(65) Prior Publication Data
US 2019/0065869 A1    Feb. 28, 2019

(30) Foreign Application Priority Data
Aug. 26, 2017    (IN) .............................. 201741030236

(51) Int. Cl.
| G06K 9/00 | (2006.01) |
| G06K 9/62 | (2006.01) |
| G06K 9/72 | (2006.01) |
| G06F 16/29 | (2019.01) |

(52) U.S. Cl.
CPC ..... G06K 9/00798 (2013.01); G06K 9/00818 (2013.01); G06K 9/6215 (2013.01); G06K 9/72 (2013.01); *G06F 16/29* (2019.01)

(58) Field of Classification Search
CPC .......... G06K 9/00798; G06K 9/00818; G06K 9/6215; G06K 9/72; G06F 16/29
See application file for complete search history.

(56) References Cited

U.S. PATENT DOCUMENTS

| 9,261,379 B1 | 2/2016 | Chatham et al. | |
| 9,470,774 B2 | 10/2016 | Boschker et al. | |
| 2005/0228584 A1* | 10/2005 | Adachi | G09B 29/106 |
| | | | 701/448 |
| 2008/0240505 A1* | 10/2008 | Nakamura | G01C 21/26 |
| | | | 382/103 |

(Continued)

FOREIGN PATENT DOCUMENTS

DE    102013003944 A1    9/2014

OTHER PUBLICATIONS

Wilkie, David, Jason Sewall, and Ming C. Lin. "Transforming GIS Data into Functional Road Models for Large-Scale Traffic Simulation." IEEE transactions on visualization and computer graphics 16.5 (2010): 1.

*Primary Examiner* — Kim Y Vu
*Assistant Examiner* — Molly Delaney
(74) *Attorney, Agent, or Firm* — Lempia Summerfield Katz LLC

(57) ABSTRACT

System and methods are provided for predicting a roadway feature. A geometric pattern in a roadway network is selected. The geometric pattern comprises one or more first links and one or more first nodes. A similar pattern to the geometric pattern is identified that comprises one or more second links and one or more second nodes in the roadway network. One or more features for the geometric pattern are identified. An absence of a feature in the similar pattern is determined based on the one or more features for the geometric pattern. A notification relating to the absence of the feature is generated.

20 Claims, 12 Drawing Sheets

(56) References Cited

U.S. PATENT DOCUMENTS

| | | | |
|---|---|---|---|
| 2008/0240506 A1* | 10/2008 | Nakamura | G06K 9/2054 |
| | | | 382/104 |
| 2009/0169055 A1* | 7/2009 | Ishikawa | G01C 21/32 |
| | | | 382/104 |
| 2012/0065811 A1* | 3/2012 | Nakamura | G01C 21/32 |
| | | | 701/1 |
| 2012/0316784 A1 | 12/2012 | Chrysanthakopoulos | |
| 2013/0311089 A1 | 11/2013 | Freed et al. | |
| 2016/0192154 A1 | 6/2016 | Modica et al. | |
| 2019/0189001 A1* | 6/2019 | Smothers | G08G 1/09675 |
| 2019/0283751 A1* | 9/2019 | Ueda | B60W 30/18154 |
| 2019/0325349 A1* | 10/2019 | Zhang | G06N 5/046 |
| 2020/0110817 A1* | 4/2020 | Viswanathan | G06F 16/215 |
| 2020/0168097 A1* | 5/2020 | Kumano | G08G 1/096725 |

\* cited by examiner

PREDICTING FEATURES ON A ROAD NETWORK WITH REPEATING GEOMETRY PATTERNS

CROSS REFERENCE TO RELATED APPLICATIONS

This application claims the benefit of Indian patent application number 201741030236 filed on Aug. 26, 2017, which is hereby incorporated by reference in its entirety.

FIELD

The following disclosure relates to navigation devices or services.

BACKGROUND

For mapping applications, accurate maps are of the utmost importance. Road network maps require a very high level of accuracy, especially when used for autonomous driving. The impact of neglecting to include a feature like a stop sign could easily result in an accident or an injury.

Roadway networks may be extensive and ever changing. New roads are built or altered each and every day. New features such as signage are added or removed. Weather events, accidents, or vandals, for example, may inadvertently or intentionally remove features from the roadway such as signage. Normal wear and tear may slowly erase features. Lane lines or maneuver directions that are provided with road surface markings may fade over time. The ever-changing features of a roadway network lead to roadway network maps being out of date soon after they are published. Ground truth data, e.g. observed data, may be collected and used to update the maps, but errors or discrepancies may still exist both due to changes and the inability of ground truth data to be constantly collected over the entirety of the roadway network.

SUMMARY

In an embodiment, a method is provided for predicting a roadway feature. A geometric pattern in a roadway network is selected. The geometric pattern comprises one or more first links and one or more first nodes. A similar pattern to the geometric pattern is identified that comprises one or more second links and one or more second nodes in the roadway network. One or more features for the geometric pattern are identified. An absence of a feature in the similar pattern is determined based on the one or more features for the geometric pattern. A notification relating to the absence of the feature is generated.

In an embodiment, a method is provided predicting a feature on a roadway network. A repeating geometric pattern is identified. A geographic database is queried for a plurality of instances of the repeating geometric pattern. The feature is identified in one or more instances of the plurality of instances. A probability score is calculated for the feature as a function of the one or more instances and the plurality of instances. An existence of the feature is predicted in a new instance of the repeating geometric pattern based on the probability score.

In an embodiment, a system is provided for predicting an upcoming feature while traversing a roadway network. The system comprises a geographic database and a processor. The geographic database of the roadway network configured to store an upcoming pattern of nodes and links similar to a repeating geometry pattern. The processor is configured to predict the upcoming feature for the upcoming pattern based on a feature in the repeating geometric pattern. The upcoming feature is not represented in the geographic database. The processor is further configured to generate a command to perform an action in response to the prediction.

BRIEF DESCRIPTION OF THE DRAWINGS

Exemplary embodiments of the present invention are described herein with reference to the following drawings.

DETAILED DESCRIPTION

Embodiments described herein provide systems and methods for predicting features for a roadway network. A roadway network including nodes and links is transformed into a graphical representation. A repeating geometry pattern is identified in the graphical representation. Features in the repeating geometry pattern identified from ground truth data are attributed to instances of the repeating geometry pattern in the roadway network.

Figure 1:
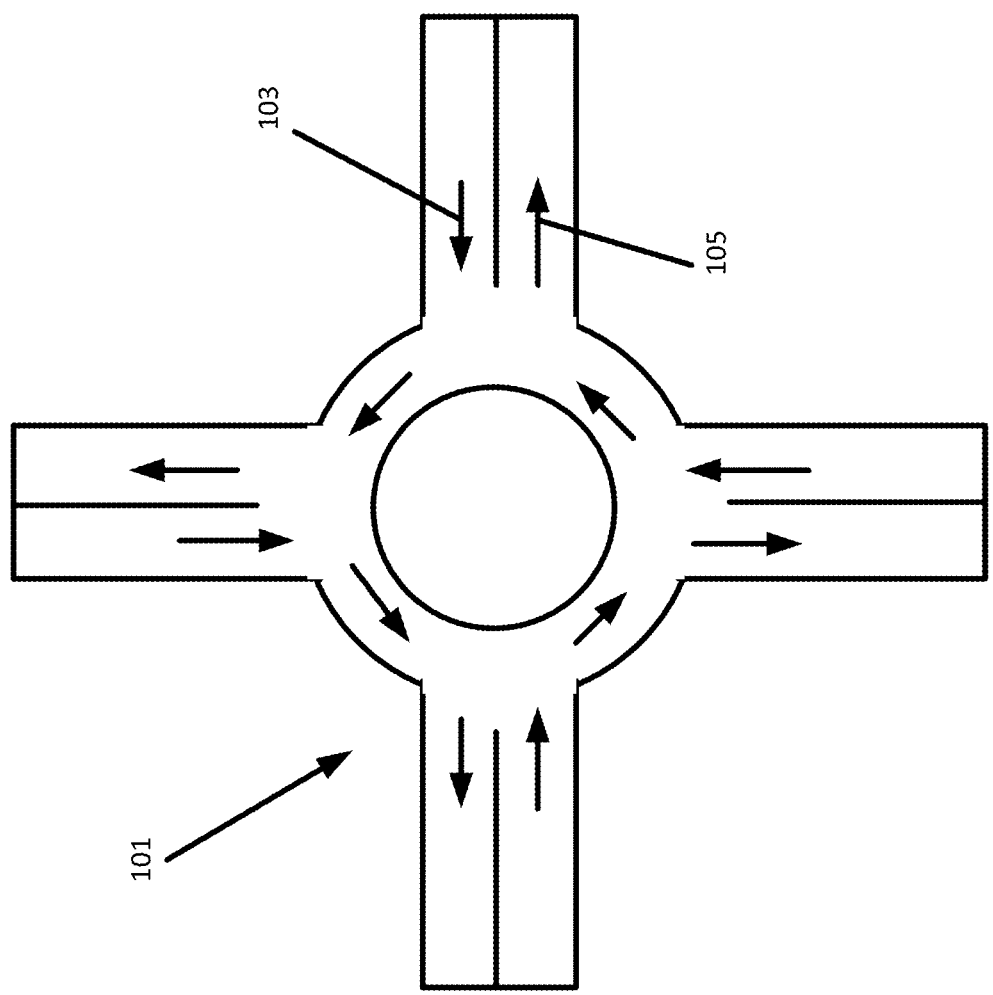
FIG. 1 depicts an example of a roadway network.

A roadway network may contain many repeating geometry patterns. A grid based system, for example, as commonly found in an urban environment, may be broken down into multiple perpendicular intersections. Other examples of commonly repeated intersections include T-junctions (e.g. an intersection between three road segments in a T shape including at least two segments at a predetermined angle less than 180 degrees), plus intersections (e.g. an intersection between four road segments in the shape of a plus sign such as the angle between any two adjacent road segments is an angle in a predetermined range, for example, between 45 degrees and 135 degrees), Y intersections (and intersection between three road segments in a Y shape such as including at least one angle in a predetermined range of less than 90 degrees), on-ramps (e.g. a lane for entering traffic), roundabouts (a circular intersection in which traffic flows in one direction), and diamond intersections (e.g. where a freeway crosses another freeway) among others. While intersections may be slightly different, the maneuvers that are required at each intersection may be similar. Features such as signage or land markings that direct the maneuvers may be similar across similar instances of intersections. FIG. 1 depicts an example of roadway network 101. FIG. 1 depicts an overhead view of a complex intersection. The complex intersection is a roundabout approachable from four directions, having an entry path 103 and exit path 105 in each direction.

The entire roundabout may be considered a repeating geometry pattern that may be replicated elsewhere in the roadway network. Further, the roundabout includes four instances of a repeating geometry pattern. As depicted, the roundabout includes four entrances 103 and four exits 105 (depicted by the arrows). Each of the entrances or exits may follow similar rules. As such, each of the entrances may include similar features.

The roadway network and the features that exist therein may be used for mapping services. Mapping services may, for example, include simple routing instructions or, for example, more complex vehicle control while traversing the roadway. As such, having an accurate accounting of the roadway network and features is very important. Further, vehicles that traverse the roadway may use sensors to detect upcoming features or objects in a path of the vehicle. If a vehicle includes an accurate map of the upcoming roadway, both detection and identification may be performed quicker and more efficiently.

Embodiments provide a method for identifying repeating geometry patterns in a roadway network. Road network maps and attributes are transformed into a graphical representation. A set of known repeating geometry patterns are identified and labelled in the graph as particular geometry definitions. Features associated with these definitions are identified for a given road in the geometry. Algorithms may be trained on existing map-graph content, and then applied to other map-graph content to predict the presence or absence of attribution.

Figure 2:
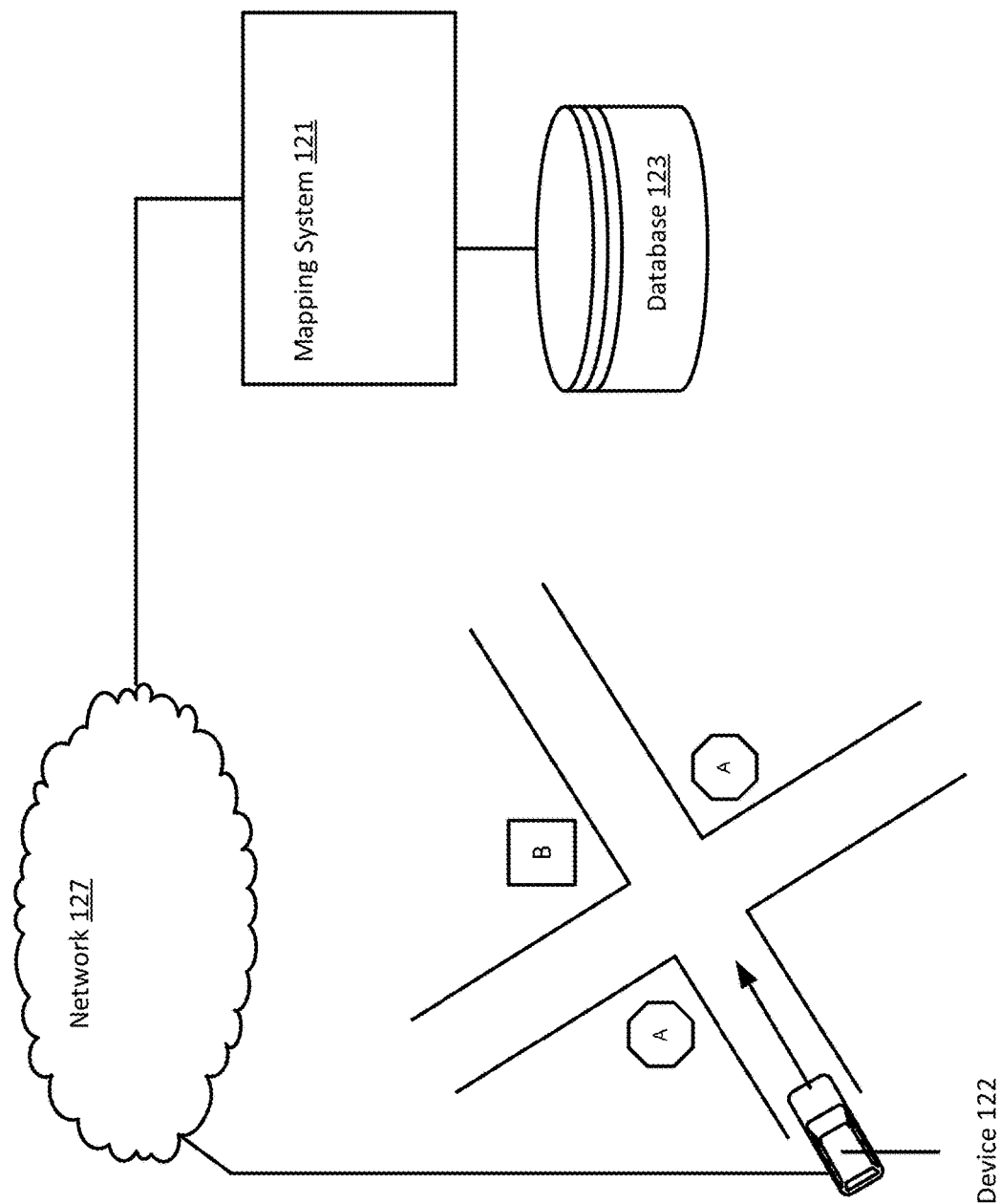
FIG. 2 depicts an example system for predicting features in a roadway network.

FIG. 2 depicts a system for predicting features on a roadway network. The system includes one or more devices 122, a network 127, and a mapping system 121. The mapping system 121 may include or may be connected to a database 123 (also referred to as a geographic database or map database). The mapping system 121 may include one or more servers 125. Additional, different, or fewer components may be included.

The system includes one or more devices 122. The one or more devices may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify the location of a vehicle or roadway conditions. The device 122 may be a navigation system built into the vehicle and configured to monitor the vehicle. The devices 122 may also be integrated in or with a vehicle. The devices 122 may include mobile phones running specialized applications that collect location data as the devices 122 are carried by persons or things traveling the roadway system. The devices 122 may be configured to collect and transmit data including the location of a vehicle. The devices 122 may be configured to monitor conditions in the vicinity of the vehicle. The devices 122 may be configured to provide guidance for a user or vehicle.

The device 122 may be configured to predict features on the roadway network or receive predictions from the location mapping system 121. As depicted in FIG. 2, the device 122 may be configured to identify an upcoming repeating geometry pattern (a two-way intersection). The device 122 may access a locally stored geographic database or access the database 123 to identify two upcoming signs (A). The device 122 may be configured to identify, based on the repeating geometry pattern, that a third sign (B) may be upcoming. The existence and location of the third sign (B) may be predicted based on features found in the repeating geometry pattern elsewhere in the roadway network.

The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the link and node information provided to the navigation device 122. An autonomous vehicle or HAD may be configured to receive alerts relating to predicted features from a mapping system 121 and automatically perform an action.

The mobile device 122 may be integrated in the vehicle, which may include assisted driving vehicles such as autonomous vehicles, highly assisted driving (HAD), and advanced driving assistance systems (ADAS). Any of these assisted driving systems may be incorporated into the device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a predicted feature.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and a predicted feature.

ADAS vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system.

A HAD or ADAS may be configured to automatically comply with features in the roadway. For example, a HAD or ADAS may receive feature data from the server 125 and automatically perform an action in order to comply with the feature. A feature, for example, a stop sign or a lane marking, may be identified by sensors on the vehicle. The feature may be identified in the geographic database 123. A HAD or ADAS may adjust a sensor to identify a feature based on data from the geographic database 123. A HAD or ADAS may determine when sensor data and data from the geographic database 123 do not agree and may alert an operator or perform an action such as reducing speed or pulling off to the side of the road.

The mapping system 121 and devices 122 are connected to the network 127. The devices 122 may receive or transmit data through the network 127. The mapping system 121 may receive or transmit data through the network 127. The mapping system 121 may also transmit paths, routes, or feature data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 may be configured to identify repeating geometry patterns in the roadway. The mapping system 121 may be configured to determine features for the repeating geometry patterns. The mapping system 121 may be configured to compare ground truth data with expected features and to generate alerts for discrepancies. The mapping system 121 may also be configured to generate routes or paths between two points (nodes) on a stored map. The mapping system 121 may be configured to provide up to date information and maps to external geographic databases 123 or mapping applications. The mapping system 121 may be configured to encode or decode map or geographic data. Geometric roadway patterns and feature data may be stored by the mapping system 121 in the geographic database 123 as link, segment, or node attributes. Feature data may be stored by the mapping system 121 using geographic coordinates such as latitude and longitude. The mapping system 121 may acquire roadway data though one or more devices 122. The roadway data may indicate that a feature exists for a location.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 may be configured to detect features and determine if a feature is absent from the geographic database 123 and/or if a mitigating action should be taken.

The mapping system 121 includes the geographic database 123. In order to provide navigation related features and functions to the end user, the mapping system 121 accesses the geographic database 123. The mapping system 121 may use data from the geographic database 123 to predict the location of a feature. For example, the mapping system 121 may identify repeating geometry patterns in a roadway described by data in the geographic database 123. The mapping system 121 may identify features for the repeating geometry patterns from ground truth data stored in the geographic database 123. The mapping system 121 may identify missing features in the geographic database 123 based on the repeating geometry patterns and ground truth data. The mapping system 121 may update or annotate the geographic database 123 with the expected features.

Figure 3:
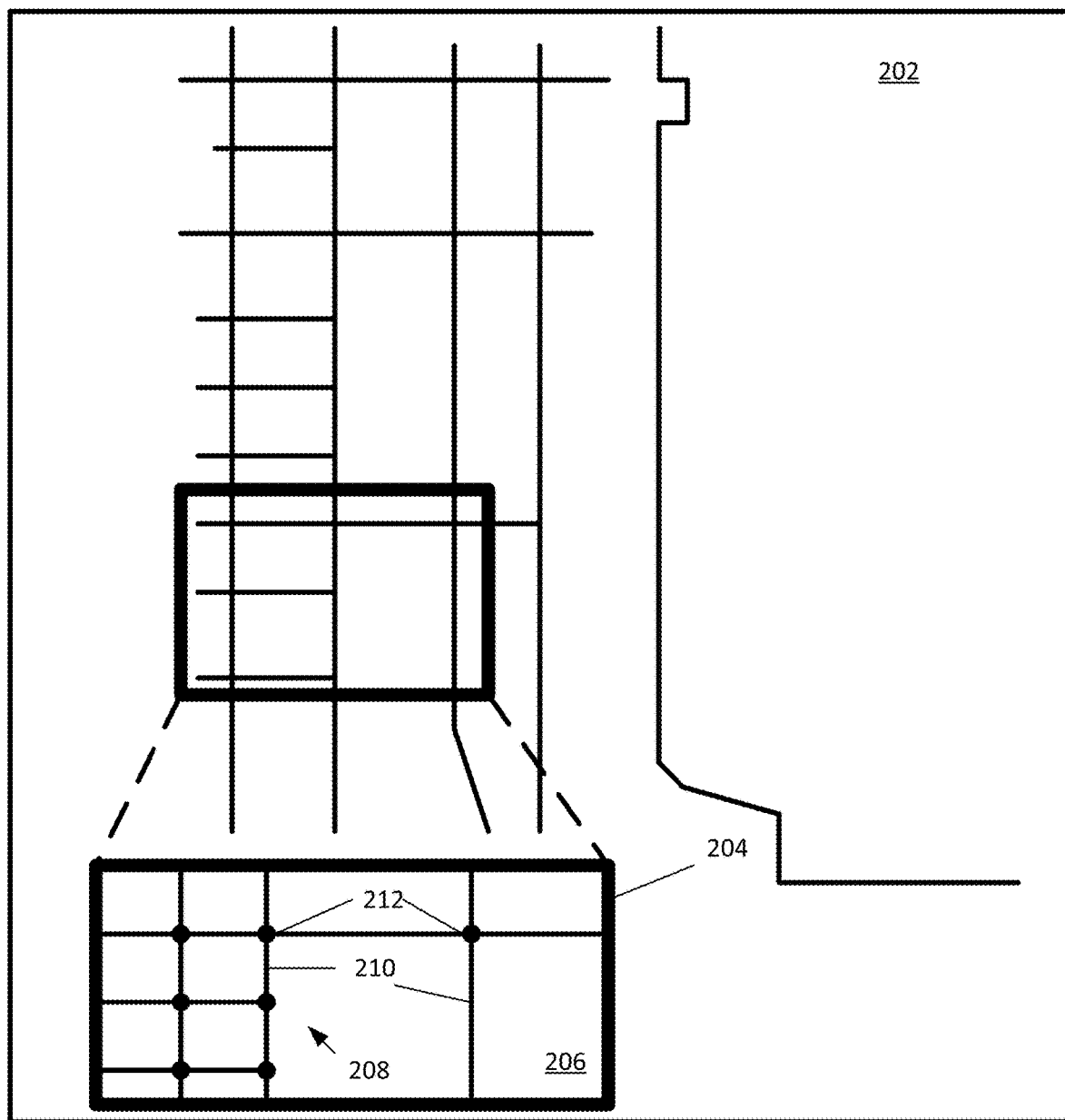
FIG. 3 depicts an example map of a roadway network.

The geographic database 123 includes information about one or more geographic regions. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 4:
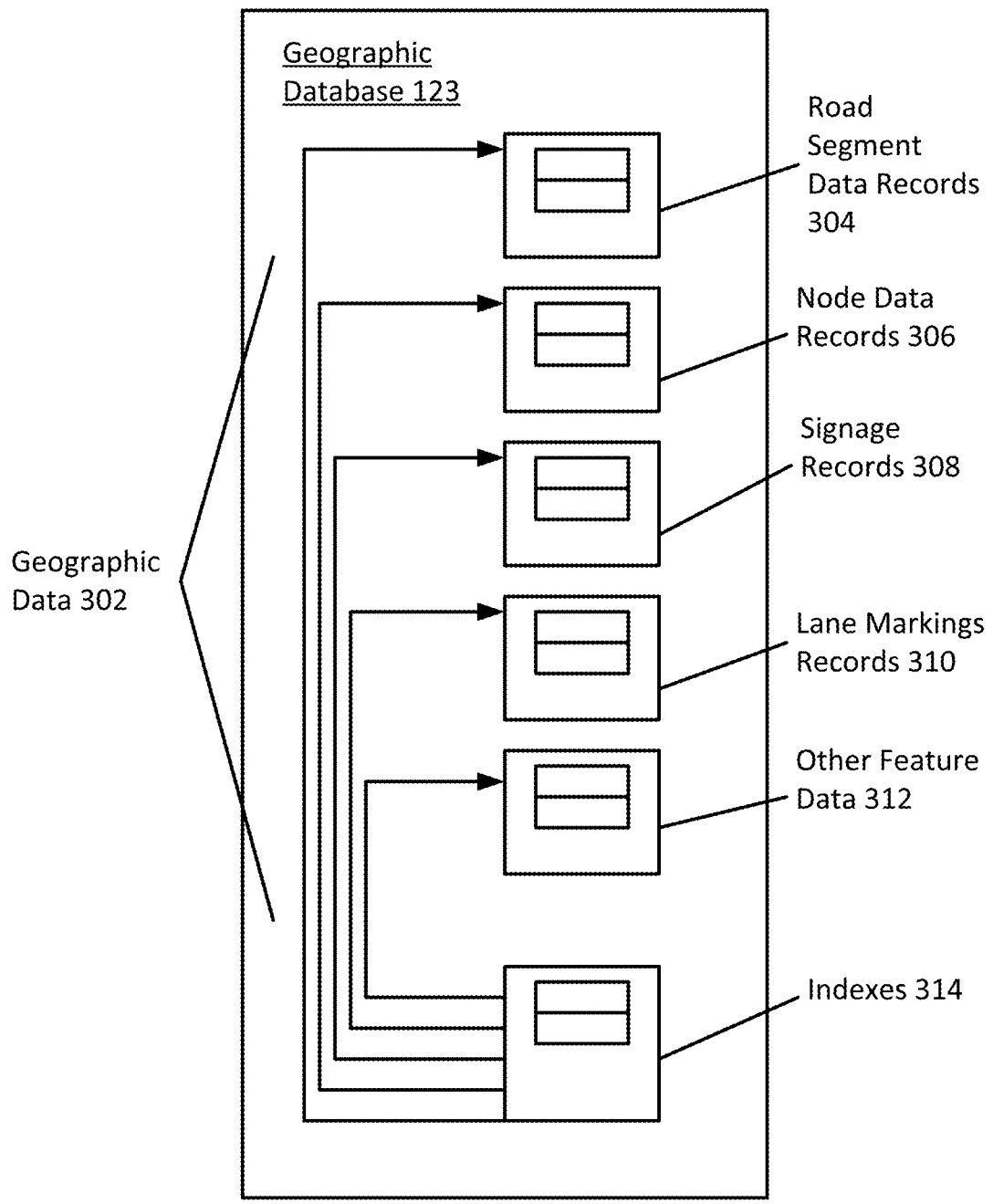
FIG. 4 depicts an example geographic database.

As depicted in FIG. 4, in one embodiment, the geographic database 123 contains geographic data 302 that represents some of the geographic features in the geographic region 202 depicted in FIG. 3. The data 302 contained in the geographic database 123 may include data that represent the road network 208. In FIG. 4, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include signage records 308 that identify the location of signage on the roadway. For example, the signage data 308 may include data for one or more signs (e.g. stop signs, yield signs, caution signs, etc.) that exist on the roadway network. The feature data may include lane marking records 310 that indicate lane marking on the roadway. The other kinds of feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate feature data such as the signage records 308 with a road segment in the segment data records 304 or a geographic coordinate. The indexes 314 may also store repeating geometry patterns or relationships for links or nodes that represent repeating geometry patterns.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Actual observed feature data may be referred to as ground truth data. Remote sensing, such as aerial or satellite photography, may be used. The database 123 is connected to the server 125.

The geographic database 123 and the data stored within the geographic database 123 may be licensed or delivered on-demand. Other navigational services or traffic server providers may access the traffic data and the feature data stored in the geographic database 123. Data including feature data may be broadcast as a service.

Figure 5:
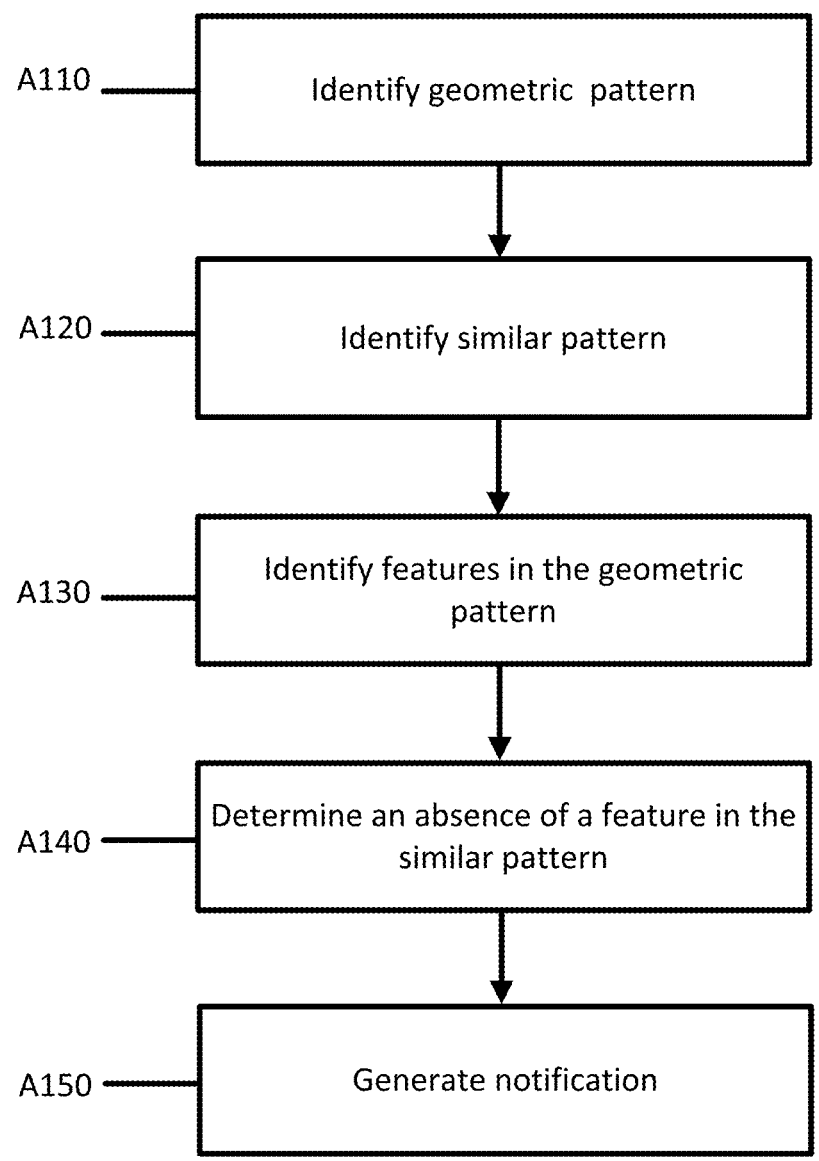
FIG. 5 depicts an example workflow for predicting features in a roadway network.

FIG. 5 illustrates an example flow chart for predicting a location of a roadway feature. As presented in the following sections, the acts may be performed using any combination of the components indicated in FIG. 2, FIG. 9, or FIG. 11. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, a pattern is identified in a roadway network. The repeating geometry pattern may include one or more links and one or more nodes. In a geographic database 123, data for the links and nodes may be stored separately. Each link may be stored as unique record in a link table or index in the geographic database 123 with geospatial properties and other attributes. Each link references two end points where the link intersects other links. These intersections of two or more links are stored as nodes in the geographic database 123, in another table in a relational database management system. Links and nodes may be referenced to each other using keys or indices. Attributes such as link types or node types may be stored in the geographic database 123.

To identify a repeating geometry pattern, geometries in the geographic database 123 are defined using a geometric graph. A graph may be a graphic representation of the network. A graph contains vertices and edges. Vertices may be represented by points or boxes. Edges may be represented as line segments between the vertices. The geometric graph includes the nodes and links from the geographic database 123 as both represented as vertices (with respective properties) with relationship(s) between a Link vertex and a Node vertex. Each Link vertex has two Node vertices (the 2 endpoints) connected to it. Each Node vertex may have one or more Link vertices connected to it through relationships.

Figure 6A:
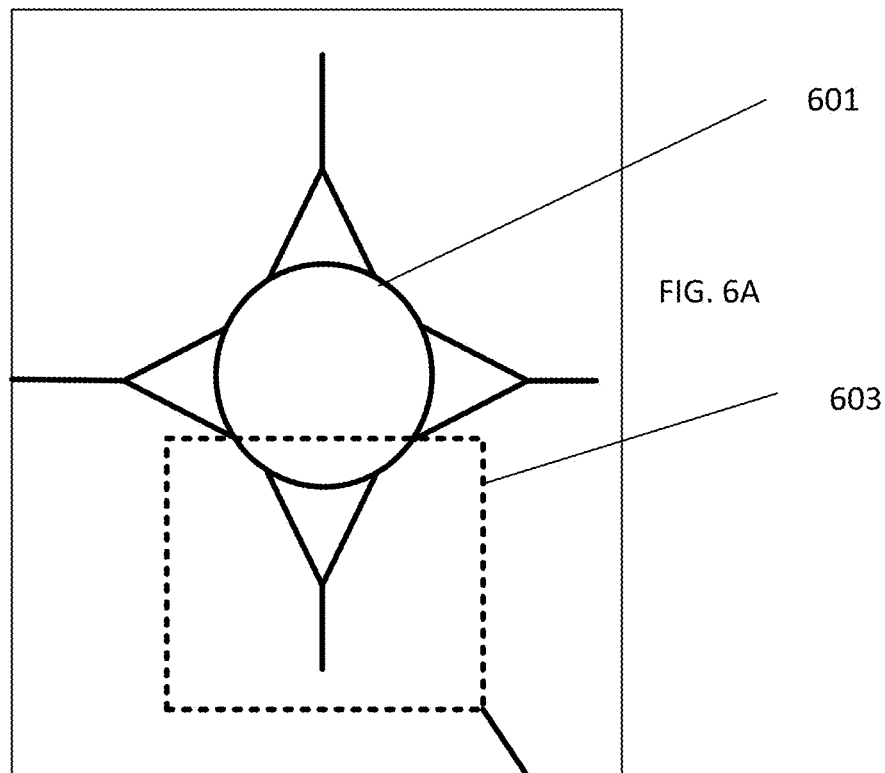
FIGS. 6A and 6B depict example of a roadway geometry pattern.
Figure 6B:
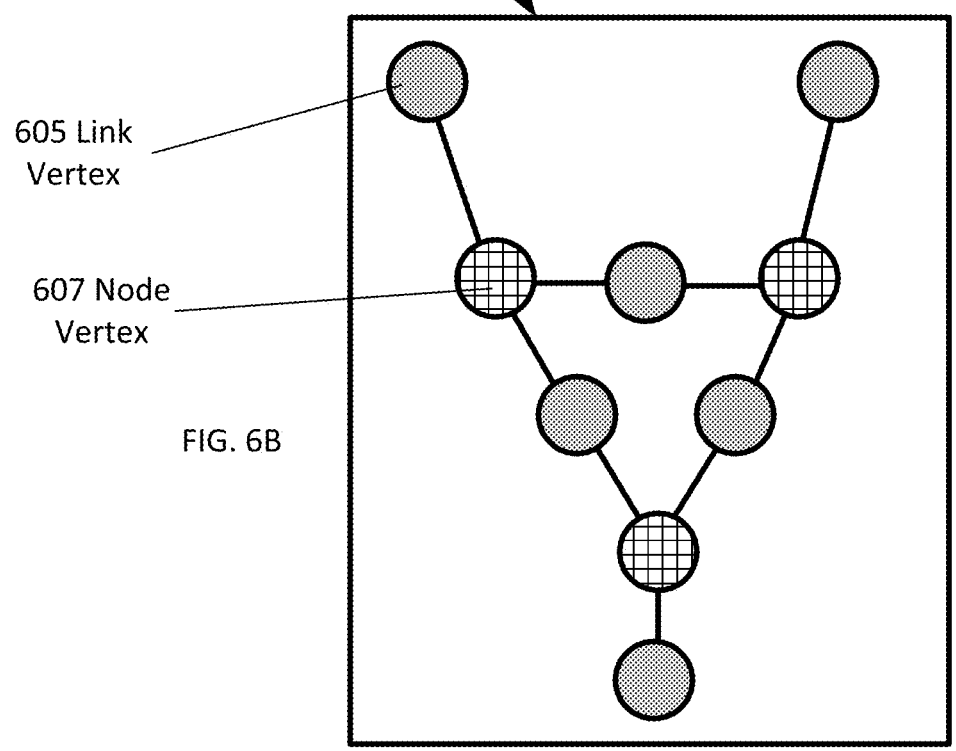

An example of the geometric graph is depicted in FIG. 6B. FIG. 6A depicts a roadway network of a roundabout 601. The roundabout includes four repeating geometric patterns of an entrance/exit of the roundabout. FIG. 6B depicts one 603 of the roundabout entrances of the roundabout depicted in FIG. 6A. FIG. 6B includes nine vertices connected by edges. Six of the nine vertices represent Link vertices 605. Three represent node vertices 607. The edges in the graph describe the relationships between the link vertices 605 and node vertices 607.

A pattern is defined in the graph by the link vertices 605 and the relationships between the link vertices 605 and node vertices 607. Other attributes of the links and nodes may be used. For example, the functional class of the link, the direction of travel along the link, and the type or number of lanes among other attributes. The functional class, for example, may indicate the number of lanes or throughput for the roadway. A larger four lane urban road, for example, may include different features than a single lane rural road even if the base relationship (e.g. geometry) of the roadway is similar. The relationships between the links may be defined by the node vertices. The nodes may include attributes such as a node type or number or type of links attached or angle between links among others.

Figure 7:
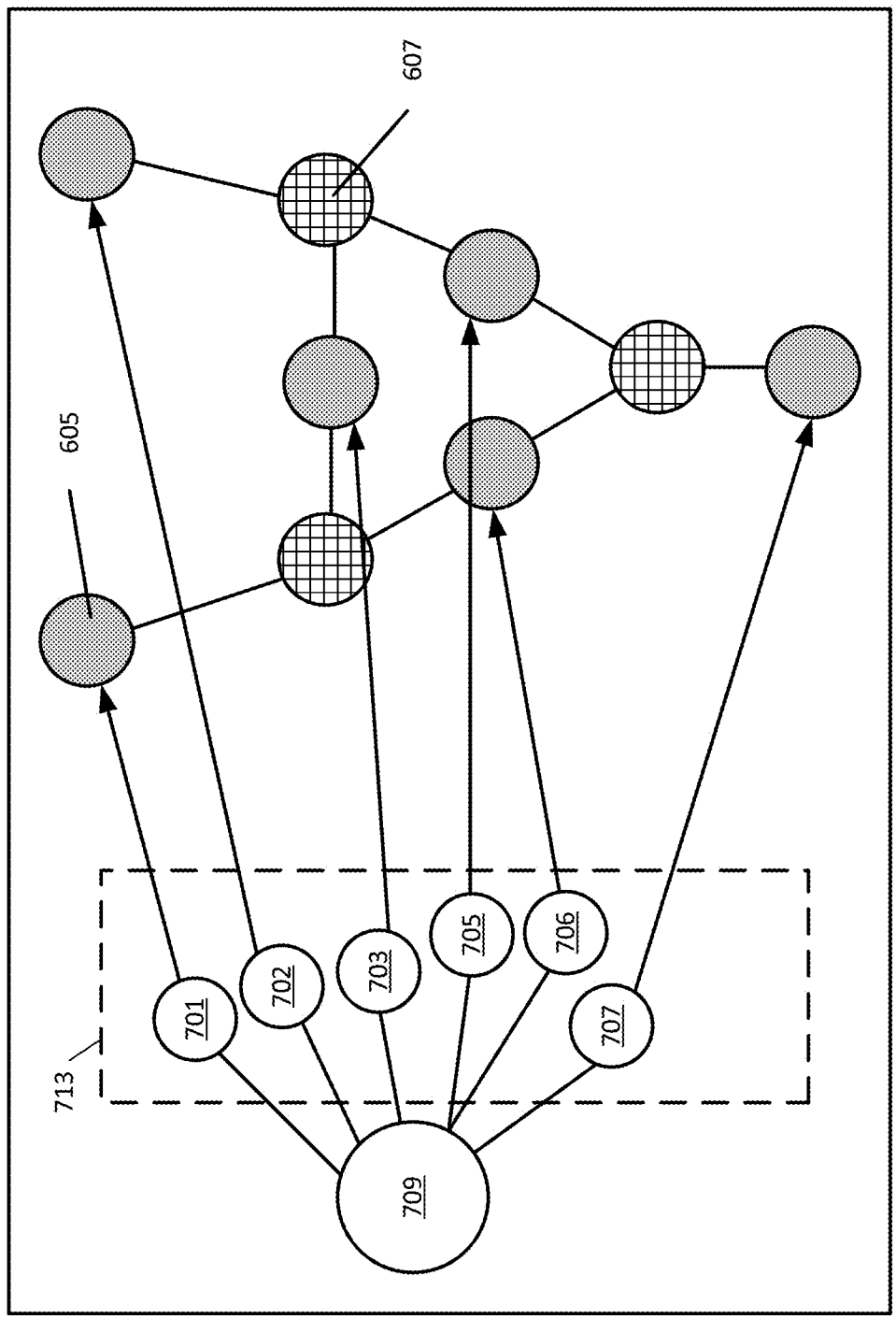
FIG. 7 depicts an example of a graph of a roadway geometry pattern.

The pattern may be stored as a geometry data type. A geometry data type 709 is depicted in FIG. 7. A geometry data type 709 may describe a repeating pattern. A geometry data type 709, for example, may include one or more rules that define the geometry of the pattern. FIG. 7 depicts the complex roundabout entrance geometry data type 709 of FIG. 6B mapped to the underlying link types and node data in the in the graph. The geometry data type 709 for the roundabout entrance includes six link vertices 605. Each of the link vertices 605 is assigned a link type 713. The link types 701, 702, 703, 705, 706, and 707 may represent a combination of attributes of the links stored in the geographic database 123. Link types, for example, may include a maneuver link, an entrance link, an exit link, a roundabout link, etc. Of the six link vertices 605, two are roundabout links 701 and 702, two are maneuver links 705 and 706, one is connection link 703, and one is an entrance link 707. While both 701 and 702 are both roundabout links, links 701 and 702 may include different types of features due to the context in which the links 701 and 702 are placed in the geometry of the roundabout. Similarly, while both 705 and 706 are maneuver links, links 705 and 706 have different directions of travel and hence are different in terms of context. The geometry data type 709 further includes three node vertices 607. One way to define the geometry data type for the roundabout entrance is by defining what is included. Here, the geometry data type 709 for the roundabout entrance may be described as 6 link vertices 605 with specific properties. The geometry data type 709 may be described more succinctly as including three links connected to a node out of which two have the attribute "Maneuver Links" and a link with the property "Roundabout" in between nodes connected to the two nodes.

Figure 8:
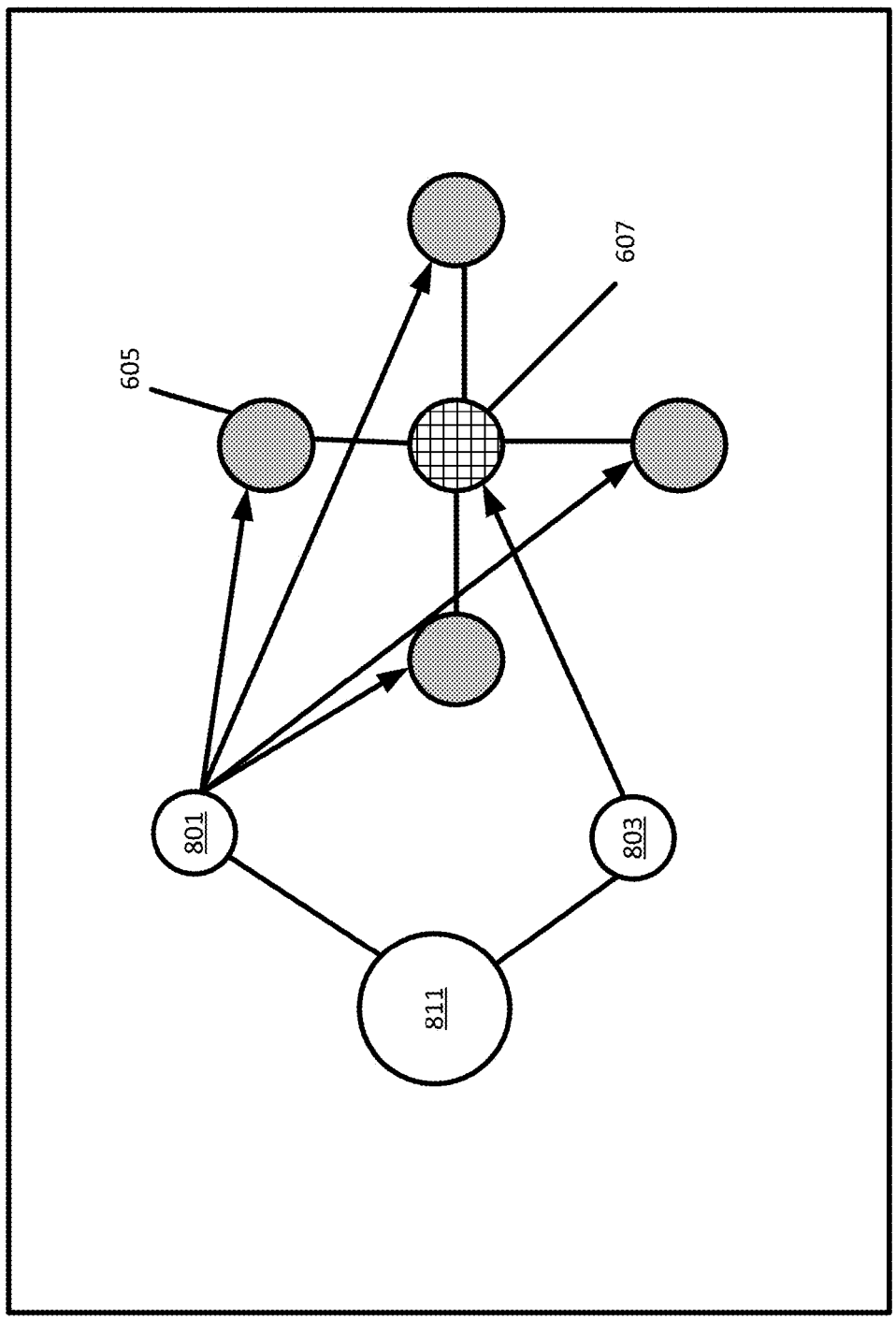
FIG. 8 depicts an example of a graph of a roadway geometry pattern.

FIG. 8 depicts a plus intersection geometry data type 811. The plus type intersection includes 4 link vertices 605 and 1 node vertex 607. Each of the four link vertices is a similar link type 801. The node vertex 607 is a node type 803. The plus type geometry data type 811 may be defined by the four link vertices 605 of type 801 each connected to a node type 803 node.

At act A120, a similar pattern is identified in the roadway network. Data for the roadway network may be stored in the geographic database 123. The geographic database 123 may store records for a plurality of nodes and a plurality of links in the roadway network. The geographic database 123 may further store attributes or properties of the nodes and links. To find similar patterns in the geographic database 123, the geographic database 123 is queried for the definition of the geometry data type. For the example of the roundabout entrance described in FIGS. 6B and 7, the steps to query for the pattern include querying the geographic database 123 for all the nodes that include three links connected to a node out of which two have the attribute "Maneuver Links". The other nodes of both the maneuver links are identified. The geographic database 123 is then queried for a link with the property "Roundabout" in between the above 2 nodes. Any set of links and nodes that fit this description may be flagged as representing a similar pattern to the roundabout geometric data type. A similar pattern may be a pattern that includes the same type of links and nodes and same attributes as the repeating pattern. For example, if a repeating pattern includes 5 type A links and 2 type B nodes, then a similar pattern would have 5 type A links and 2 type B nodes. In an embodiment, the links and nodes in the similar pattern may not be identical to the types of links and nodes in the repeating pattern. In an example, one or more links or nodes may be a different functional class. One or more additional links or nodes may be present in the similar pattern with the similar pattern including all of the types and attributes of the repeating pattern. One or more fewer links or nodes may be present in the similar pattern. The less similar the pattern to the repeating pattern, the less the features may match up. An identical similar pattern may be expected to include each feature of the repeating pattern, while a similar pattern that is missing one or more links may be less likely to include a feature. A level of similarity between the similar pattern and the repeating pattern may be used to calculate a probability of a predicted features.

In an embodiment, a machine taught classifier or algorithm may be used on the geographic data to detect a similar pattern. Other methods such as statistical analysis or decision trees may be used to identify statistical similarity in the roadway network by employing linear mathematical models or simple conditional logic. Data mining techniques may be used to identify patterns. Data mining techniques may be trained in an unsupervised or supervised manner.

For machine learning, support vector machines (SVMs, also support vector networks) may be used by the classifier to learn to classify sections of the roadway network. SVMs include supervised learning models with associated learning algorithms that analyze the roadway data used for classification and regression analysis. Given a set of training examples, each example marked as belonging to a category (e.g. a geometric pattern), an SVM training algorithm builds a model that assigns new examples to one category or the other.

Alternative modeling systems may be used to learn to identify patterns in the roadway data, such as deep learning though neural networks or generative models. Deep machine learning may use neural networks to analyze the roadway network. Neural networks may include a collection of interconnected processing nodes. The connections between the nodes may be dynamically weighted. Neural networks learn relationships through repeated exposure to data and adjustment of internal weights. Neural networks may capture nonlinearity and interactions among independent variables without pre-specification. Whereas traditional regression analysis requires that nonlinearities and interactions be detected and specified manually, neural networks may perform the tasks automatically.

At act A130, one or more features for the repeating geometry pattern are identified. Features may be stored in the geographic database 123. Features includes attributes of a roadway link or node such as signage, lane markings, rumple strips, guard rails, barriers, etc. Features may be permanent or temporary. Features may inform a driver or vehicle about the roadway condition or roadway maneuvers. For example, a stop sign indicates for a vehicle to stop, a yield sign indicates for a vehicle to yield, a broken line means that a vehicle can maneuver, a solid white line indicates that the vehicle must stay in the lane. Features may prescribe mandatory actions, for example a stop sign, or provide warnings, for example a rail road crossing sign. Features may be repeated across the roadway network in patterns. Similar intersections, for example, may include similar signage or lane markings. In the example of FIG. 7 above, each roadway link in the roundabout entrance may include one or more features. These features may exist in other similar roadway links that are part of a similar pattern. A roundabout may include multiple entrances that may include similar link and node types and as the function of the links and nodes are similar, the features may also be similar. The table below describes signage features present on the links of FIG. 7.

TABLE 1

| Feature | Links |
| --- | --- |
| Stop Sign | (705), (706) |
| Do Not Enter Sign | (705), (706) |
| Oneway Sign | (705), (706) |
| Pedestrian Sign | (707), (705), (706) |
| Speedbump Sign | (707), (705), (706) |
| Directional Sign | (701), (702), (705), (706) |
| Traffic Signal Sign | (701), (702), (705), (706), (703) |
| Yield Sign | (705), (706) |
| Roundabout Sign | (707), (705), (706) |
| Speedlimit Sign | (707), (705), (706) |

Link 706 for example includes a signage such as a stop sign, a do not enter sign, a one-way sign, a pedestrian crossing sign, a traffic signal, a yield sign, a roundabout sign, a speed limit sign, and a no left turn sign.

In an embodiment, features for multiple instances of the repeating geometry pattern may be identified. Five, 10, 100, or more instances may be identified in the roadway network. Features may be identified in each of the links and node of each of the instances. The features may be aggregated to calculate a probability score. For example, if 94 out of 100 of the instances include a similar feature on a corresponding link, the probability score may be calculated at 94%. Other methods may be used to calculate the probability score. Certain instances may be weighted differently; certain instances may be ignored; instances may be grouped by region or location. For example, an older instance (e.g. built earlier or with older ground truth data, may be weighted less than an instance that was recently observed). The data structure for the repeating geometry pattern may be stored with a list of features that are expected. If a probability score is calculated, the score may be stored with the data structure. An example of a repeating geometry pattern data structure is depicted below in Table 2.

TABLE 2

Roundabout Entrance

| Links | Stop Sign | Directional Sign | Do Not Enter Sign | No Left Turn | Pedestrian Crossing |
|---|---|---|---|---|---|
| (707) | 0% | 0% | 0% | 0% | 81% |
| (705) | 100% | 100% | 99% | 5% | 80% |
| (706) | 98% | 100% | 100% | 66% | 83% |
| (703) | 0% | 0% | 0% | 0% | 0% |
| (701) | 1% | 100% | 0% | 0% | 0% |
| (702) | 0% | 95% | 0% | 0% | 0% |

Table 2 lists the probabilities of signage for the roundabout data structure (repeating geometry pattern). For example, for Link 706, there is a 98% probability of a stop sign, a 100% probability of a directional sign, and a 100% probability of a do not enter sign. The probabilities may be calculated from ground truth data acquired at multiple instances of the repeating geometry pattern.

At act A140, an absence of the one or more features is determined in the similar pattern. The list of identified features from act A130 may be compared to features detected on the similar pattern identified at act A120. Any discrepancies between the two feature lists may be identified. In an embodiment, the features detected in the similar pattern may be compared to a list of features in a data structure for the repeating geometry pattern. The data structure may include a list or table (such as Table 1 or 2 above) that has an aggregated list of features that exist across multiple instances of the repeating geometry pattern.

In an embodiment, the probability scores may be used to identify problem areas in the roadway network. For example, in the table for link 705, there is a 100% probability of a stop sign. However, for link 706, there is only a 98% chance. If the probability scores are based on ground truth data, the discrepancy (98 vs 100%) may indicate that there should be a stop sign at 100% of link 706's in the pattern. An alert may be generated that informs a responsible party (e.g. roadway maintenance or government agency) to make sure that a stop sign is placed at the missing locations. Alternatively, based on the ground truth data, link E has a 1% chance to have a stop sign. A low probability close to zero may indicate that either the ground truth data was observed incorrectly, the geographic database 123 contains an error, or that the sign exists but should be removed. In an embodiment, a machine taught classifier or algorithm may be used on the data to detect when a feature is missing or where a feature has been incorrectly applied.

At act A150, a notification is generated that relates to the absence of the one or more features. A notification may include an alert message. An alert message may be generated based on a real-time determination of an absence of a feature. Alternatively, or subsequently, an update may be published to the geographic database 123 that indicates the absence of a feature. For example, if an expected stop sign is determined to be absent on a roadway link in the geographic database 123, an attribute for the link may be generated and store with the link that indicates the possibility of a stop sign. The notification may be transmitted to a responsible party for the roadway. For example, for a location with an expected stop sign, the notification may be sent to a department of transportation. The notification may be transmitted to field personal, so that the field personal may manually review the location.

The attribute may be used by navigation systems when traversing the roadway network. Sensors on a vehicle may be adjusted to better identify the feature even though the feature has not been verified to exist. For example, image processing techniques may be adjusted to detect a feature in captured data from a vehicle sensor.

In an embodiment, algorithms may be trained on existing geographic database 123 content, and then applied to other geographic database 123 content to predict the presence or absence of features. Acts A110-130 may be performed in one geographic database 123 to identify repeating geometry patterns and the predicted features. Act A140 may then be performed on a different geographic database 123 to identify missing features or error. The repeating geometry patterns found in one region may be used to validate features in other regions.

Figure 9:
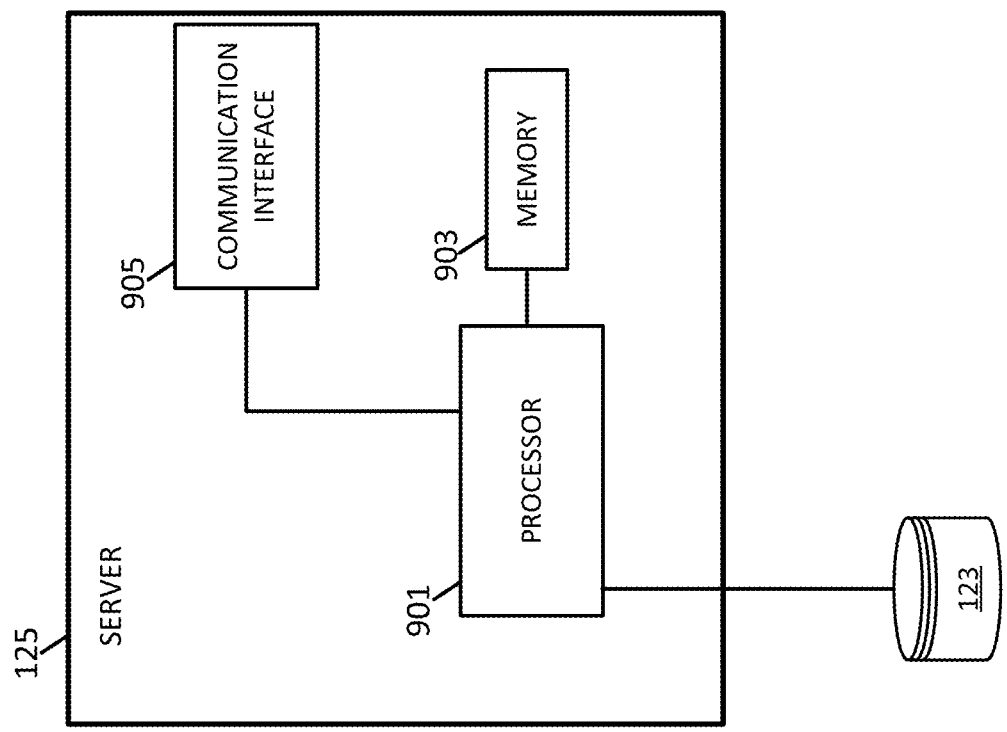
FIG. 9 depicts an example server of FIG. 2.

FIG. 9 illustrates an example server 125 of the system of FIG. 2. The server 125 includes a processor 901 that is connected to a communications interface 905 and a memory 903. The processor 901 is also connected to the geographic database 123. The communications interface 905 is configured to receive vehicle data from a vehicle. The memory 903 is configured to store roadway geometry patterns, feature data, and vehicle data. The processor 901 is configured to analyze a roadway network to identify repeating geometric patterns. The processor 901 is configured to identify features common to the repeating geometry pattern. The processor 901 is configured to identify discrepancies between the identified features and existing features in the geographic database 123. The processor 901 is configured to predict the existence of a feature even though the feature may not exist in the geographic database 123 based on the repeating geometry pattern. The processor 901 may be configured to generate maps and routing instructions. Additional, different, or fewer components may be included.

The processor 901 may include a general processor, digital signal processor, an application specific integrated circuit (ASIC), field programmable gate array (FPGA), analog circuit, digital circuit, combinations thereof, or other now known or later developed processor. The processor 901 may be a single device or combinations of devices, such as associated with a network, distributed processing, or cloud computing.

The communications interface 905 may include any operable connection. An operable connection may be one in which signals, physical communications, and/or logical communications may be sent and/or received. An operable connection may include a physical interface, an electrical interface, and/or a data interface. The communications interface 905 provides for wireless and/or wired communications in any now known or later developed format. The communications interface 905 may include a receiver/transmitter for digital radio signals or broadcast mediums.

The memory 903 may include one or more of a read only memory (ROM), random access memory (RAM), a flash memory, an electronic erasable program read only memory (EEPROM), or other type of memory. The memory is configured to store data for the repeating geometry pattern. The memory may store a list of features for each repeating geometry pattern.

Figure 10:
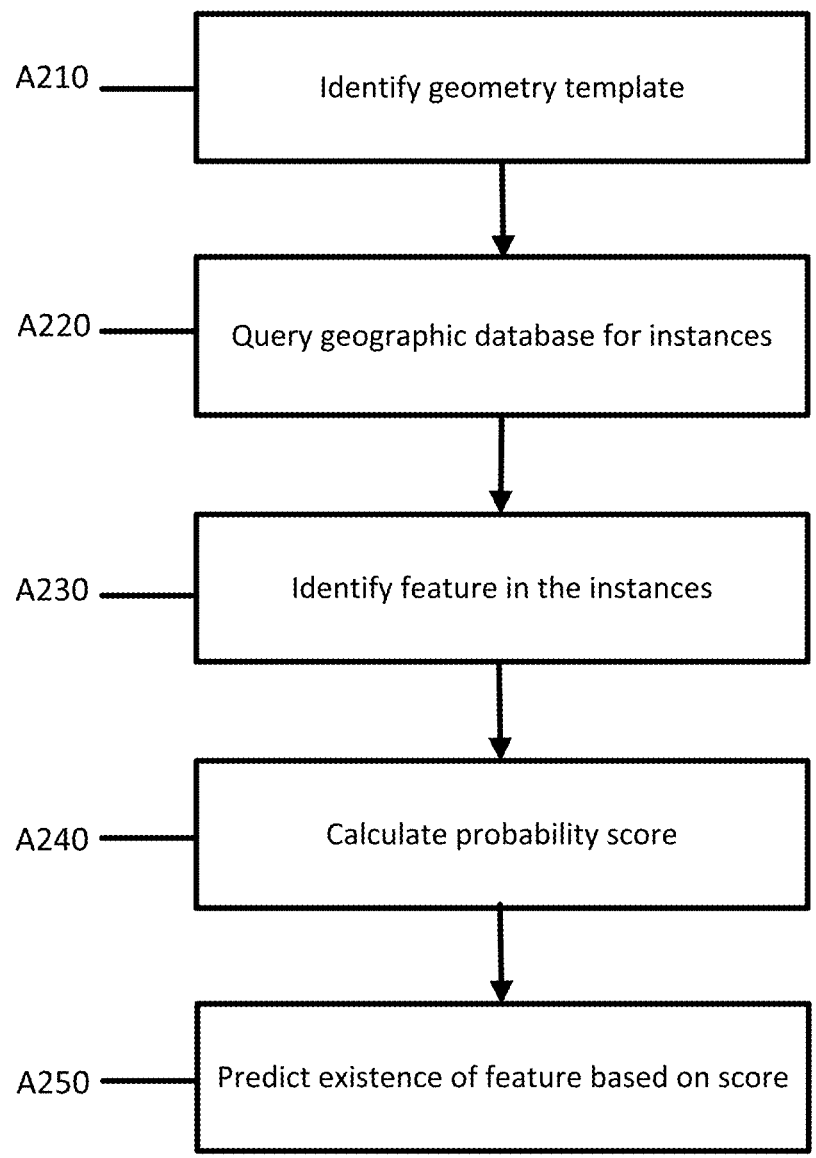
FIG. 10 depicts an example workflow for predicting features in a roadway network.

FIG. 10 depicts an example method for predicting features using the server 125 of FIG. 9. As presented in the following sections, the acts may be performed using any combination of the components indicated in FIG. 2, FIG. 9, or FIG. 11. The following acts may be performed by the server 125, the device 122, the mapping system 121, or a combination thereof. Additional, different, or fewer acts may be provided. The acts are performed in the order shown or other orders. The acts may also be repeated. Certain acts may be skipped. In an example of the embodiment, an algorithm for detecting repeating geometry patterns is applied to query a geographic database 123, and predicts there is a 95% likelihood that an intersection should have a stop sign. Due to the high likelihood, the stop sign may be added to the geographic database 123 without human review, therefore increasing an automated capability of encoding reality into a data map representation.

At act A210, the processor 901 identifies a repeating geometry pattern. The repeating geometry pattern may describe a repeating geometry pattern of links and nodes found in the geographic database 123. The template may define the relationships between the links and nodes using a graph. The graph may provide a visual representation of the links and nodes as vertices and the relationships as edges. For example, a template may define a geometry as three A-type links connected to a C-type node, two of the A-type links are connected to a B-type node which is further connected with a B-type link. The repeating geometry pattern may be alternatively described by listing the type of links, the type of nodes, and additional attributes.

At act A220, the processor 901 queries a geographic database 123 for a plurality of instances of the repeating geometry pattern. The template, as identified in act A210, may include a definition or set of rules that define the roadway geometry. The geographic database 123 may be queried based on the rules to determine instances of the roadway geometry in the geographic database 123. For the example given above, the geographic database 123 may be queried for three A-type links connected to a C-type node. Additional rules for the template may then be further queried in the subset. The definition or rules may include the link and node types and attributes for the link and nodes. The attributes may include, for example, the connections for each link or node or the functional classifications of the link. A query by the processor may include a query for link type that is connected to one or more other link types, that are connected to, for example, a node type, wherein each of the link types are a certain functional class of roads. In an embodiment, an instance may include the same types and attributes of the repeating geometry pattern. Alternatively, the instance may include similar types or attributes but not be identical. For example, an instance may include the same types but not the same attributes. Queries may be performed on subset of data in the geographic database, for example, a region or area.

In an embodiment, the geographic database 123 may include data records for instances of the repeating geometry pattern. Instances may have been previously identified and flagged.

At act A230, a feature is identified in one or more instances of the plurality of instances. Features may include roadway signage, lane markings, overhead bridges/overpasses, etc. Feature data may be stored in the geographic database 123. Feature data may be cross referenced with link or node data records. The repeating geometry pattern may include one or more specific links. Similar links are present in each of the instances identified at act A220. The features for each of these links may be identified in the geographic database 123. The feature data in the geographic database 123 may correspond to ground truth data of the features. The location of a stop sign, for example, that is in the geographic database 123 may have been actually observed by a probe vehicle or operator.

At act A240, the processor 901 calculates a probability score for a feature as a function of a number of the one or more instances and a number of the plurality of instances. The probability score may represent the chance that a feature will be found at a location in an instance similar to the roadway geometry based on previously identified features. For example, if in act A230, 78 out of 100 instances include a feature at a similar location in the pattern, then the probability score may be calculated as 78%. The probability score may be calculated using additional inputs. For example, instances may be weighted differently. A instance that includes a feature that was observed 10 years ago may be weighted less than an instance that includes the feature that was observed two weeks ago. A probability score may be calculated as a binary score. For example, any percentage under 50% may indicate that a feature is not probable, while a percentage of 50% or greater indicates that the feature is probable. Different labeling schemes may be used such as: not probable, probable, highly probable, absolute.

At act A250, the existence of the feature is predicted in a new instance of the roadway geometry type based on the probability score. Different features may use different thresholds for the probability score to predict that a feature would be present on a new instance of the roadway geometry. A stop sign, for example, may require a higher probability score than a pedestrian crossing sing. Stop signs may be facetiously deployed at intersections due to the importance of their implication. A pedestrian crossing sign, however, may be used less, resulting in a lower probability score, even if the pedestrian crossing sign is warranted at the location.

The processor 901 may update the geographic database 123 with the predicted existence of the feature. The predicted feature may be added as an attribute to the road segment or node. The probability score may be included with the predicted feature. A vehicle that henceforth traverses the road segment that the predicted feature is on, may be notified of the predicted feature even though the predicted feature has not been observed. The vehicle or navigation device may validate that the predicted feature is at the location and transmit data to the server 125 to further update the geographic database 123.

In an embodiment, the server 125 may generate an alert or notification for field personal to check the location of the predicted feature. In an embodiment, the server 125 may store the repeating geometry pattern for use in designing or configuring new construction. For example, a feature list for a plus intersection repeating geometry pattern may be used to make sure that a newly constructed plus intersection includes all the necessary features.

In an embodiment, the prediction of a feature may be used to provide a directive for a vehicle or driver. For example, a navigation device traversing a roadway may identify an upcoming repeating geometry pattern. The navigation device may identify a predicted feature. The predicted feature may result in an action being performed or suggested by the navigation device. The prediction may be used in navigation systems without cameras which may help the navigation system detect possible features in the road network without relying on accurate map data.

Figure 11:
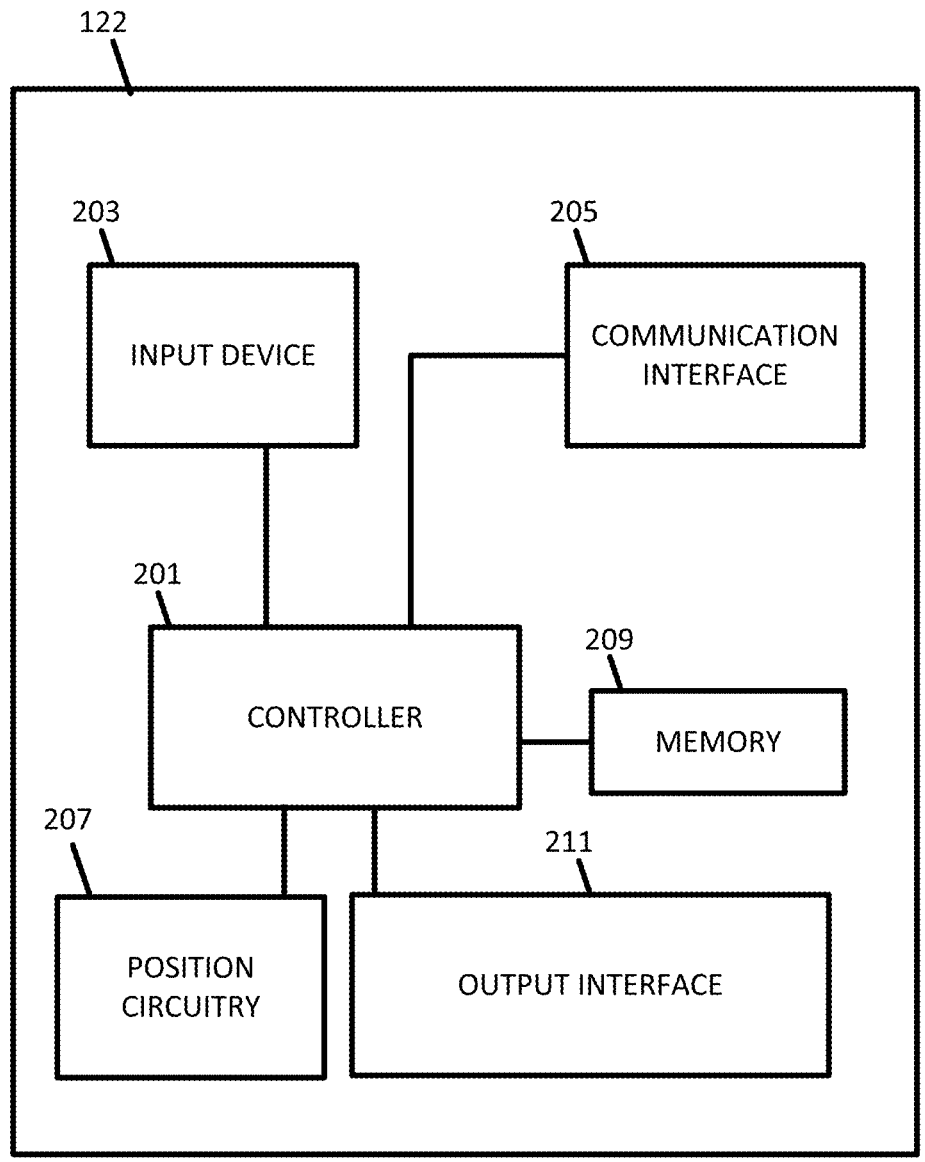
FIG. 11 depicts an example device of FIG. 2.

FIG. 11 illustrates an example device 122 of the system of FIG. 1. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, and an output interface 211. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

Figure 12:
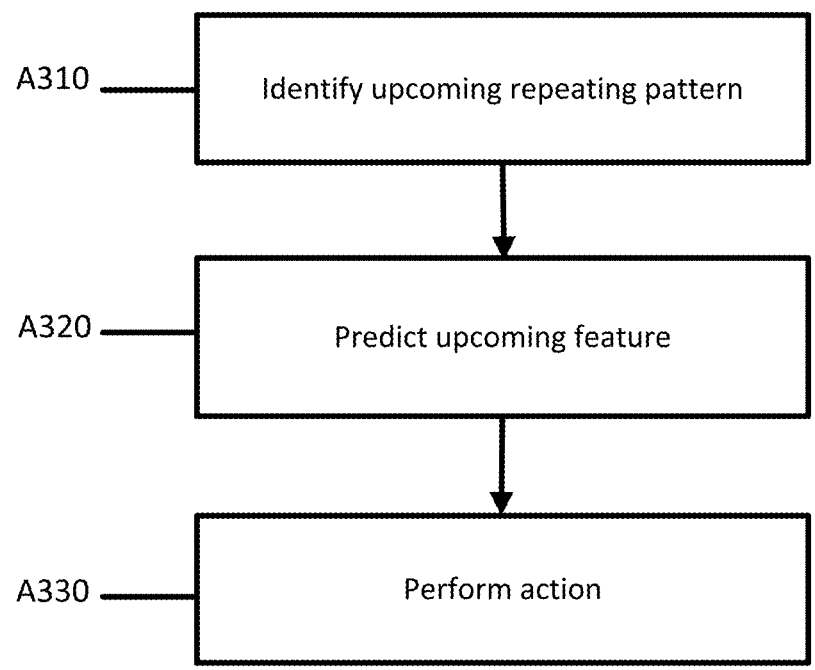
FIG. 12 depicts an example workflow for predicting features in a roadway network.

FIG. 12 illustrates an example flow chart for identifying upcoming features on a roadway network. As presented in the following sections, the acts may be performed using any combination of the components indicated in FIG. 2, FIG. 9, or FIG. 11. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A310, the controller 201 identifies in a geographic database 123 (or other database or memory) of the roadway network, an upcoming repeating geometry pattern. A device may traverse a roadway network. The current location of the device (and as such, vehicle) may be identified using positional circuitry 207 such as GPS or other positional inputs. The positioning circuitry 207, which is an example of a positioning system, is configured to determine a geographic position of the device 122. The positioning circuitry 207 may include movement circuitry, which is an example a movement tracking system, is configured to determine movement of a device 122. The position circuitry 207 and the movement circuitry may be separate systems, or segments of the same positioning or movement circuitry system. In an embodiment, components as described herein with respect to the navigation device 122 may be implemented as a static device. For example, such a device may not include positional circuitry 207, but may involve a speed or velocity detecting input device. The device 122 may identify its position as the device travels along a route using the positional circuitry. For indoor spaces without GPS signals, the navigation device 122 may rely on other geolocation methods such as LIDAR, radar, Wi-Fi, beacons, landmark identification, inertial navigation (dead reckoning), among others.

The device 122 may be configured to execute routing algorithms using a geographic database 123 to determine a route to travel along a road network from a starting location to a destination location in a geographic region. Using input from an end user, the device 122 examines potential routes between the origin location and the destination location to determine the optimum route in light of user preferences. The device 122 may identify a repeating geometry pattern in a route. The device 122 may then provide the end user with information about the route in the form of guidance that identifies the maneuvers required to be taken by the end user to travel from the origin to the destination location. The device 122 may use the identification of the repeating geometry patterns in the route to predict the location of features. Some devices 122 show detailed maps on displays outlining the route, the types of maneuvers to be taken at various locations along the route, locations of certain types of features, and so on. The device may receive data from the geographic database 123 through the communications interface 205.

The communications interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums.

The device 122 may be configured to identify an upcoming repeating geometry pattern in the geographic database 123 in the vicinity of the current location of the device 122. The device 122 may store one or more patterns in the memory. The device may store rules for identifying similar patterns. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123.

At act A320, the controller 201 predicts an expected feature at a location in the upcoming repeating geometry pattern, wherein the feature is not present at the location in the geographic database 123 (or other database or memory). The prediction n may be stored in the geographic database 123. For example, the geographic database 123 may store predicted features at locations in the geographic database 123. The geographic database 123 may have updated by, for example, the mapping system 121 with one or more predicted features derived from detecting repeating geometry patterns and features. Alternatively, the device 122 may identify the predicted feature by comparing a list of features for the repeating geometry pattern with the features in the geographic database 123. Any differences between the list of features and the features in the geographic database 123 may be labeled as suspect. For example, a missing feature from the geographic database 123 may be treated as if the feature is actually upcoming, whereas vice versa a feature that is in the geographic database 123 but not in the feature list, may be ignored or given a lower priority.

At act A330, the device 122 performs an action in response to the prediction. The controller 201 may generate a textual, auditory, or visual alert with information that relates to the prediction. For example, an alert may be provided to a user by the output interface 211. The output interface 211 may be a liquid crystal display (LCD) panel, light emitting diode (LED) screen, thin film transistor screen, or another type of display. The output interface 211 may also include audio capabilities, or speakers.

In an embodiment, the device may generate a command to adjust a sensor. Sensor, such as video, radar, or lidar may be used by a vehicle to detect objects in the vicinity of the vehicle. A sensor may be configured to sense upcoming features in the geographic database 123. Image processing for a sensor may be adjusted or configured to better detect the upcoming feature. For example, an image classifier may be configured to detect specific upcoming signage. In an example, for an upcoming pedestrian crossing sign, the sensor may be adjusted to detect pedestrians. The vehicle may also decrease speed in such a scenario.

The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the link and node information provided to the navigation device 122. An autonomous vehicle or HAD may be configured to receive expected feature alerts from a mapping system 121 and automatically perform an action.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed. Embodiment 1: A method for predicting a roadway feature, the method comprising: selecting, by a processor, a geometric pattern in a roadway network, the geometric pattern comprising one or more first links and one or more first nodes; identifying, by the processor, a similar pattern to the geometric pattern, the similar pattern comprising one or more second links and one or more second nodes in the roadway network; identifying, by the processor, one or more features for the geometric pattern; determining, by the processor, an absence of a feature in the similar pattern based on the one or more features for the geometric pattern; and generating, by the processor, a notification relating to the absence of the feature.

Embodiment 2: the method of embodiment 1, wherein selecting the geometric pattern comprises: identifying, by the processor, one or more connections between the one or more first links; and defining, by the processor, one or more relationships between the one or more first links and first nodes based on one or more attributes of the links and the one or more connections, wherein the geometric pattern is defined the one or more relationships.

Embodiment 3: the method of embodiment 2, wherein a combination of attributes represents a link type.

Embodiment 4: the method of embodiment 2, wherein one or of the one or more attributes comprises a roadway functional class.

Embodiment 5: the method of embodiment 2, wherein the connections comprise the one or more first nodes.

Embodiment 6: the method of embodiment 1, wherein the one or more second links in the similar pattern comprises a same type and attributes of the one or more first links in the geometric pattern and the one or more second nodes in the similar pattern comprises a same type and attributes of the one or more second nodes in the geometric pattern.

Embodiment 7: the method of embodiment 1, wherein the notification is an alert transmitted to a vehicle.

Embodiment 8: the method of embodiment 1, wherein the notification comprises an update to a geographic database.

Embodiment 9: the method of embodiment 1, further comprising calculating a probability score that the feature is absent in the similar pattern.

Embodiment 10: a method of predicting a feature on a roadway network, the method comprising: identifying a repeating geometric pattern; querying a geographic database for a plurality of instances of the repeating geometric pattern; identifying the feature in one or more instances of the plurality of instances; calculating a probability score for the feature as a function of the one or more instances and the plurality of instances; and predicting an existence of the feature in a new instance of the repeating geometric pattern based on the probability score.

Embodiment 11: the method of embodiment 10 wherein identifying the repeating geometric pattern comprises: identifying one or more connections between one or more first links in the repeating geometric pattern; and defining one or more relationships between the one or more links and one or more nodes of the geometric repeating pattern based on one or more attributes of the one or more links and the one or more connections, wherein the geometric pattern is defined the one or more relationships.

Embodiment 12: the method of embodiment 11, wherein the one or more attributes comprise a link type of the one or more links.

Embodiment 13: the method of embodiment 10, wherein calculating the probability score comprises: calculating a ratio of the number of the one or more instances versus the number of the plurality of instances.

Embodiment 14: the method of embodiment 13, wherein one of the one or more instances is weighted differently when calculating the ratio.

Embodiment 15: a system for predicting an upcoming feature while traversing a roadway network, the system comprising: a geographic database of the roadway network configured to store an upcoming pattern of nodes and links similar to a repeating geometry pattern; and a processor configured to predict the upcoming feature for the upcoming pattern based on a feature in the repeating geometric pattern, wherein the upcoming feature is not represented in the geographic database; the processor further configured to generate a command to perform an action in response to the prediction.

Embodiment 16: the system of embodiment 15, wherein the repeating geometry pattern comprises a plurality of link types and a plurality of relationships between the plurality of link types.

Embodiment 17: the system of embodiment 16, wherein the repeating geometry pattern further comprises a functional class for each of the plurality of link types.

Embodiment 18: the system of embodiment 15, wherein the upcoming features is a stop sign and the action is to stop a vehicle.

Embodiment 19: the system of embodiment 15, wherein the action is a command to adjust a sensor of vehicle.

Embodiment 20: the system of embodiment 19, wherein the command comprises an adjustment of an image processing parameter of the sensor to better detect the upcoming feature.

We claim:

1. A method for predicting a roadway feature, the method comprising:
    selecting, by a processor, a geometric pattern in a roadway network, the geometric pattern comprising one or more first links and one or more first nodes stored in a geographic database;
    defining and storing, by the processor, the geometric pattern as a geometry data type that includes one or more rules that define a geometric relationship of the one or more first links and one or more first nodes, the geometry data type further including one or more features related to the one or more first links and one or more first nodes;
    querying, by the processor, the geographic database for combinations of links and nodes with similar patterns to the geometry data type that follow the one or more rules;
    identifying, by the processor in the geographic database, a similar pattern of one or more second links and one or more second nodes that follows the one or more rules;
    determining, by the processor, an absence in the geographic database of the one or more features in the similar pattern; and
    generating, by the processor, a notification relating to the absence of the one or more features.

2. The method of claim 1, wherein selecting the geometric pattern comprises:

identifying, by the processor, one or more connections between the one or more first links; and defining, by the processor, the one or more rules for the one or more first links and first nodes based on one or more attributes of the links and the one or more connections.

3. The method of claim 2, wherein a combination of attributes represents a link type.

4. The method of claim 2, wherein one or of the one or more attributes comprises a roadway functional class.

5. The method of claim 2, wherein the connections comprise the one or more first nodes.

6. The method of claim 1, wherein the one or more second links in the similar pattern comprises a same type and attributes of the one or more first links in the geometric pattern and the one or more second nodes in the similar pattern comprises a same type and attributes of the one or more second nodes in the geometric pattern.

7. The method of claim 1, wherein the notification is an alert transmitted to a vehicle.

8. The method of claim 1, wherein the notification comprises an update to the geographic database.

9. The method of claim 1, further comprising:

calculating a probability score that the one or more features are absent in the similar pattern.

10. A method of predicting a feature on a roadway network, the method comprising:

identifying a repeating geometric pattern in a geographic database comprising at least two links and a node;

querying a geographic database for a plurality of instances of the repeating geometric pattern;

identifying the feature in one or more instances of the plurality of instances;

calculating a probability score for the feature as a function of the one or more instances and the plurality of instances; and predicting an existence of the feature in a new instance of the repeating geometric pattern based on the probability score.

11. The method of claim 10, wherein identifying the repeating geometric pattern comprises:

identifying one or more connections between the at least two links in the repeating geometric pattern; and defining one or more relationships between the at least two links and the node of the repeating geometric pattern based on one or more attributes of the at least two links and the one or more connections, wherein the repeating geometric pattern is defined the one or more relationships.

12. The method of claim 11, wherein the one or more attributes comprise a link type of the at least two links.

13. The method of claim 10, wherein calculating the probability score comprises:

calculating a ratio of the number of the one or more instances versus the number of the plurality of instances.

14. The method of claim 13, wherein one of the one or more instances is weighted differently when calculating the ratio.

15. A system for predicting an upcoming feature while traversing a roadway network, the system comprising:

a geographic database of the roadway network configured to store a geometric data type comprising a geometric pattern of at least two links and a node; and a processor configured to identify in the geographic database, an upcoming pattern of nodes and links similar to the geometric data type and predict the upcoming feature in the geographic database for the upcoming pattern based on a feature included in the geometric data type, wherein the upcoming feature is not represented in the geographic database; the processor further configured to generate a command to perform an action in response to the prediction.

16. The system of claim 15, wherein the geometric data type further comprises a plurality of link types and a plurality of relationships between the plurality of link types.

17. The system of claim 16, wherein the geometric data type further comprises a functional class for each of the plurality of link types.

18. The system of claim 15, wherein the upcoming feature is a stop sign and the action is to stop a vehicle.

19. The system of claim 15, wherein the action is a command to adjust a sensor of vehicle.

20. The system of claim 19, wherein the command comprises an adjustment of an image processing parameter of the sensor to better detect the upcoming feature.

* * * * *